United States Patent [19]

Okubo et al.

[11] Patent Number: 4,608,877
[45] Date of Patent: Sep. 2, 1986

[54] GEAR SHIFT DEVICE FOR TRANSMISSIONS

[75] Inventors: Kiyokazu Okubo, Fujimi, Japan; Walter Guss, Gössendorf; Herwig Leinfellner, Graz, both of Austria

[73] Assignee: Honda Giken Kogyo Kabushiki Kaisha, Tokyo, Japan

[21] Appl. No.: 650,027

[22] Filed: Sep. 13, 1984

[30] Foreign Application Priority Data

Oct. 5, 1983 [JP] Japan .................................. 58-186090

[51] Int. Cl.⁴ .......................... G05G 9/12; G05G 5/10
[52] U.S. Cl. .................... 74/473 R; 74/476; 74/477
[58] Field of Search ............. 74/473 R, 475, 476, 74/477

[56] References Cited

U.S. PATENT DOCUMENTS

| | | | |
|---|---|---|---|
| 4,016,773 | 4/1977 | Galas et al. | 74/477 X |
| 4,377,951 | 3/1983 | Magg et al. | 74/477 |
| 4,484,489 | 11/1984 | Boutant | 74/473 R |
| 4,494,419 | 1/1985 | Inui et al. | 74/473 R X |

FOREIGN PATENT DOCUMENTS 2506570 9/1975 Fed. Rep. of Germany .

Primary Examiner—Allan D. Herrmann
Attorney, Agent, or Firm—Armstrong, Nikaido, Marmelstein & Kubovcik

[57] ABSTRACT

A gear shift device for transmissions, comprising a plurality of gear shift rods provided with connecting members and clutch-actuating shift forks, the rods being arranged in parallel with one another and mounted to be movable in the lengthwise direction thereof, and a gear shift shaft provided with fingers engageable with the connecting members, the gear shift shaft being disposed at right angles to the gear shift rods and rotationally and axially movable around and along an axis thereof, the gear shift rods consisting of a plurality of groups of rods disposed in a plurality of positions which are spaced from each other along the axis of the gear shift shaft, the fingers being fixed to a plurality of spaced portions of the gear shift shaft so as to be opposed to the groups of gear shift rods.

6 Claims, 4 Drawing Figures

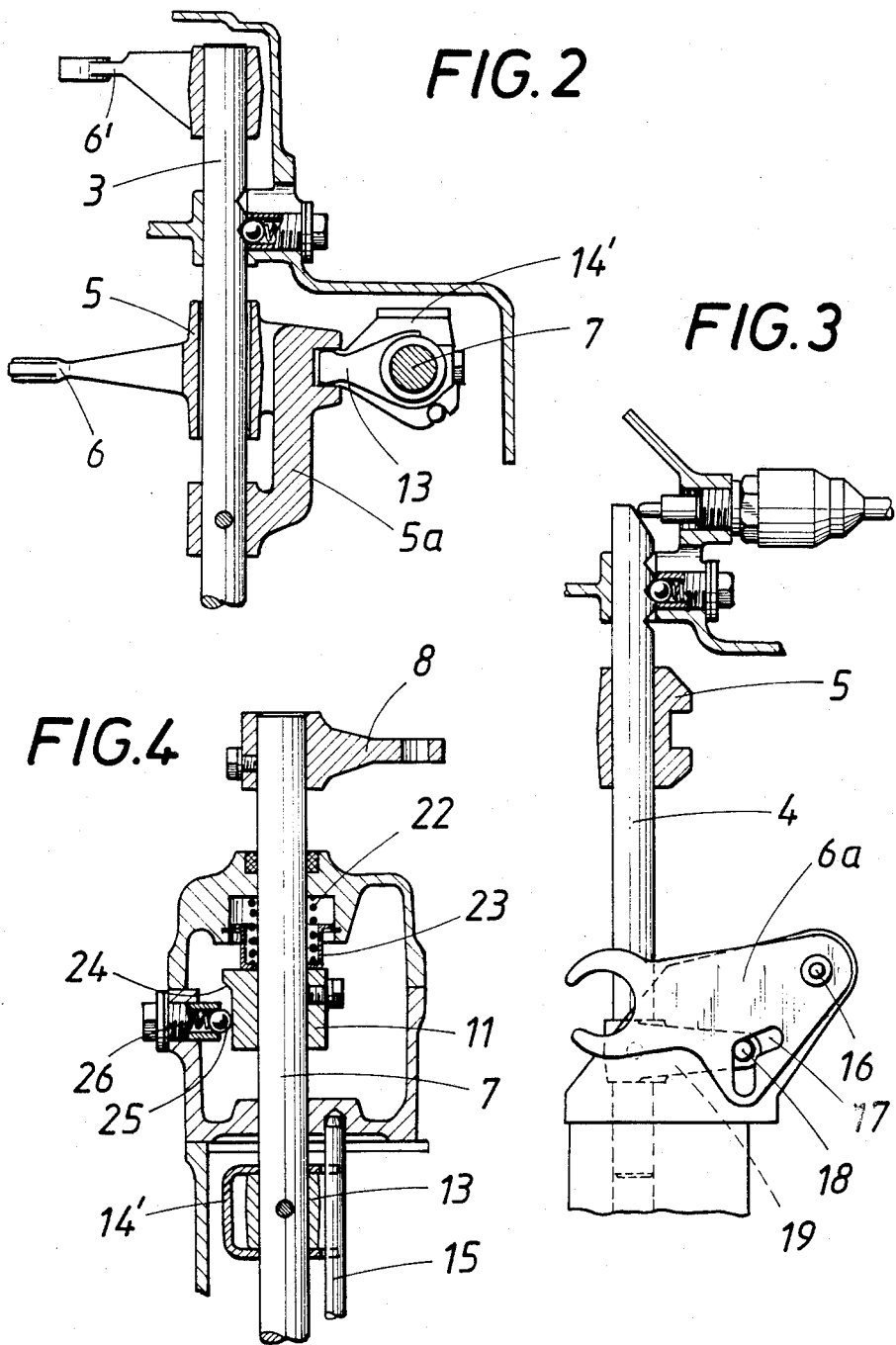

GEAR SHIFT DEVICE FOR TRANSMISSIONS

BACKGROUND OF THE INVENTION

The present invention relates to a gear shift device for tranmissions, and more particularly to a gear shift device which consists of a plurality of gear shift rods provided with connecting members and clutch-actuating shift forks and arranged in parallel with one another in such a manner that each of the gear shift rods can be moved in the lengthwise direction thereof, and a gear shift shaft provided with fingers engageable with the connecting members. The gear shift shaft is disposed at right angles to the gear shift rods and is rotationally and axially movable around and along its axis.

In a conventional gear shift device of this kind, a gear shift shaft is moved in its axial direction to engage a finger with a connecting member of a desired gear shift rod. The shaft is then turned to move the gear shift rod in its lengthwise direction and actuate a clutch by a shift fork mounted on the rod. In order to reduce the distance of axial travelling and the amount of angular displacement of the gear shift shaft in such a conventional gear shift device, a plurality of gear shift rods are arranged at short distances apart from one another in parallel. Nevertheless, the distances between the gear shift shaft and gear shift rods, and the distances between the gear shift rods and clutches are comparatively long. Accordingly, the lengths of the fingers, connecting members, or shift forks increase. In order to transmit sufficient driving force to a required part in such an arrangement, it is necessary to suitably reinforce the fingers, connecting members, or shift forks, so that the weight of these parts necessarily increases to a comparatively high level.

There is also a known gear shift device (German Patent Publication No. 2506570), in which two connecting members are fixed to the spaced portions of a gear shift shaft which extends at right angles to the parallel-arranged rods and is capable of being moved along and around its axis. In this gear shift device, the second finger is used to set the claws of a synchronizing clutch engaged with each other easily. The way of arranging the gear shift rods in this gear shift device is not different from that in the previously-described prior art device of this kind.

OBJECT AND SUMMARY OF THE INVENTION

The present invention has been developed with a view to eliminating such drawbacks encountered in the conventional gear shift device of this kind. An object of the present invention is to provide a gear shift device for transmissions, which is suitable for use in multi-step speed changing operations, and which has a comparatively simple construction consisting of light parts.

According to the present invention, a plurality of gear shift rods consists of a plurality of groups of rods disposed in a plurality of positions which are spaced from each other along the axis of the gear shift shaft, the fingers being fixed to a plurality of spaced portions of the gear shift shaft so as to be opposed ot the groups of gear shift rods.

BRIEF DESCRIPTION OF THE DRAWINGS

The accompanying drawings illustrate an embodiment of the present invention, wherein:

FIG. 2 is a sectional view taken along the line II—II in FIG. 1;

FIG. 3 is a sectional view, which corresponds to FIG. 2, of the parts in the vicinity of a gear shift rod for a reverse gear train; and FIG. 4 is a sectional view taken along the line IV—IV in FIG. 1.

DETAILED DESCRIPTION OF A PREFERRED EMBODIMENT

Figure 1:
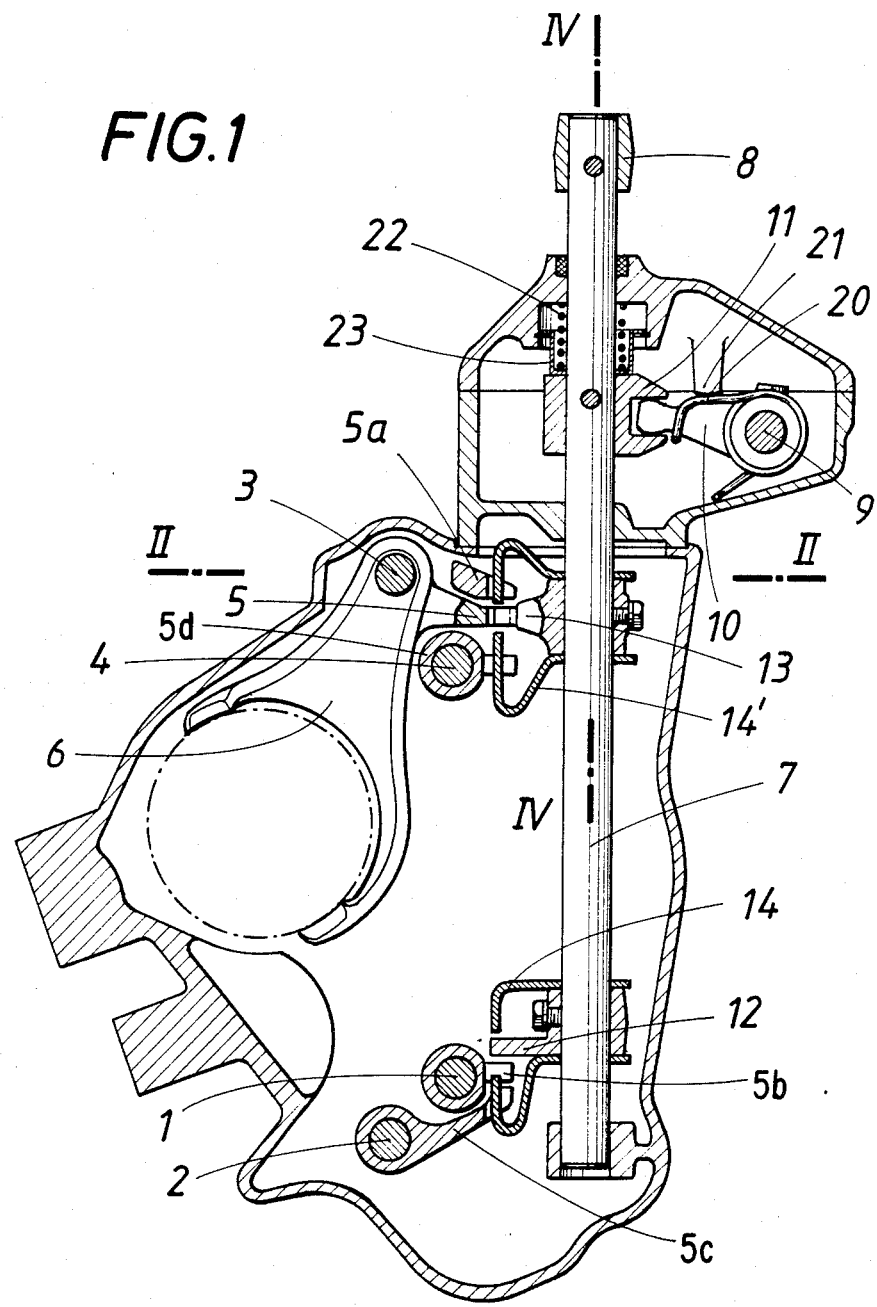
FIG. 1 is a general side elevational cross-sectional view of one embodiment of the invention.

An embodiment of the present invention will now be described with reference to the drawings. First, referring to FIG. 1, four parallel gear shift rods 1, 2, 3, 4 are arranged and mounted so that they can be moved in their lengthwise directions. A gear shift shaft 7 is disposed so that its axis extends at right angles to the gear shift rods 1-4. The gear shift shaft 7 can be moved linearly in its axial direction, and pivotally around its axis. Six forward gear trains and one reverse gear train of a speed change gear can be established selectively by operating the gear shift shaft 7.

The gear shift rod 1 provided with a shift fork (not shown) for establishing first and second speed gear trains selectively, and the gear shift rod 2 for establishing a super-low-speed gear train, for example, a cross-country gear train are arranged in parallel with each other in the vicinity of one end (lower end in FIG. 1) of the gear shift shaft 7. These gear shift rods 1, 2 have their respective connecting members 5b, 5c fixed thereto and extending toward the gear shift shaft 7. In a position which is spaced along the axis of the gear shift shaft 7 from the position in which the two gear shift rods 1, 2 are arranged, the gear shift rod 3 is provided with a shift fork 6 and a shift fork 6', which is shown in FIG. 2 to be described later, for establishing three high-speed gear trains, for example, third, fourth and fifth speed gear trains selectively. The gear shift rod 4 is provided with a shift fork 6a (refer to FIG. 3) for establishing a reverse gear train. Rod 3 and rod 4 are arranged in parallel with each other. A pair of connecting members 5, 5a extend from the gear shift rod 3 toward the gear shift shaft 7. Another connecting member 5d extends from the gear shift rod 4 toward the gear shift shaft 7.

A crank arm 8 is fixed to the other end (upper end in FIG. 1) of the gear shift shaft 7 to turn the gear shift shaft 7. A locking member 11 is fixed to an intermediate portion of the gear shift shaft 7. An arm 10 fixed to a pivotable shaft 9, which is disposed at right angles to the gear shift shaft 7, engages with the locking member 11. Accordingly, when the shaft 9 is turned, the arm 10 is moved pivotally to cause the gear shift shaft 7 to be moved in the axial direction thereof.

In the two positions, which are spaced from each other in the axial direction of the gear shift shaft 7, the connecting members 5, 5a are provided in such a manner that the connecting members 5, 5a are spaced from each other in the axial direction of the gear shift shaft 7. A pair of fingers 12, 13 are fixed to the portions of the gear shift shaft 7 which are opposed to these two positions. One finger 12 is engageable with one of the connecting members 5b, 5c of the gear shift rods 1, 2, while the other finger 13 is engageable with one of the three connecting members 5, 5a 5d of the gear shift rods 3, 4. When the gear shift shaft 7 is moved in its axial direction, the fingers 12, 13 and connecting members 5, 5a, 5b, 5c, 5d engage with each other selectively. When the gear shift shaft 7 is turned with a finger and a connecting member engaged with each other, the shift forks 6, 6', 6a are moved to establish a desired gear train or separate an established gear train.

The gear shift shaft 7 is further provided with two U-shaped members 14, 14' which are fixed to the shaft 7 so as to hold the fingers 12, 13 from both sides thereof. The U-shaped members 14 14' can turn relative to the shaft 7. Turn-preventing rods 15 (refer to FIG. 4) which extend in parallel with the gear shift shaft 7 are engaged with the U-shaped members 14'. Accordingly, when the gear shift shaft 7 is moved axially, the U-shaped members 14 are moved therewith. However, when the gear shift shaft 7 is turned, the turning of the U-shaped members 14 is prevented because the members 14 14' engage with the turn-preventing members 15. Moreover, when the finger 12 or 13 engages with one of the connecting members 5, 5a, 5b, 5c, 5d the U-shaped members 14, 14' lock the remaining connecting members 5, 5a, 5b, 5c, 5d. For example, when the gear shift device is in the operational mode shown in FIG. 1, the upper finger 13 is engaged with the connecting member 5 of the gear shift rod 3 with the remaining connecting members , 5a, 5d being locked by the U-shaped members 14'; the lower finger 12 is in a position, which is out of the area in which the lower finger 12 can engage with the connecting members 5b, 5c of the gear shift rods 1, 2.

Referring to FIG. 2, the gear shift rod 3 is provided with two shift forks 6, 6' for selectively establishing one of the third, fourth and fifth speed gear trains. One shift fork 6' is fixed to the gear shift rod 3 to establish the fifth speed gear train. The other shift fork 6 is slideably mounted on the gear shift rod 3 so that it can be moved slidingly in the lengthwise direction of the rod 3. The shift fork 6 is provided with an independent connecting member 5 and contributes to the establishment and separation of the third and fourth speed gear trains. The connecting member 5a is fixed to the gear shift rod 3, and the shift fork 6' is moved via the connecting member 5a and gear shift rod 3.

Referring to FIG. 1 again, the distance between the two fingers 12, 13 is set equal to that between the connecting member 5c of the gear shift rod 4 for a reverse gear train and the connecting member 5 of the gear shift rod 2 for a super-low-speed gear train. Therefore, when the gear shift shaft 7 is moved to the lowermost position in FIG. 1, the two fingers 12, 13 engage the connecting members 5c, 5d of the gear shift rods 2,4, respectively.

In order to prevent the reverse gear train from being established when a super-low-speed gear train is established, the shift fork 6a corresponding to the gear shift rod 4 for the reverse gear train is not connected directly thereto. Namely, the shift fork 6a is supported pivotably on a shaft 16 which extends at right angles to the gear shift rod 4. The shift fork 6a is provided with an arcuate groove 17, into which a pin 18 implanted in a lateral arm 19, which is fixed to the gear shift rod 4, is inserted. The arcuate groove 17 has a first portion extending in parallel with the gear shift rod 4 and a second portion at an angle thereto. While the pin 18 is moved in the first portion of the groove 17, the gear shift rod 4 moves without effect. Namely, when the gear shift shaft 7 is turned for establishing a super-low-speed gear train, the gear shift rod 4 is moved downward in FIG. 3, and a super-low-speed gear train is already established by the time the pin 18 has come into contact with the lower end of the groove 17. Accordingly, during this time, the shift fork 6a is not turned, and the reverse gear train does not move at all. On the other hand, in order to establish the reverse gear train, the gear shift shaft 7 may be turned in the opposite direction. In accordance with the pivotal movement of the gear shift shaft 7 in the reverse direction, the gear shift rod 4 is moved upward in FIG. 3, and the shift fork 6a is turned clockwise in FIG. 3, so that the reverse gear train is established. During this time, the gear shift rod 2 for a super-low-speed gear train is moved in the same gear train-separating direction. Since the travelling distance, which is required to establish a reverse gear train of the gear shift rod 4, is longer than that thereof required to separate a super-low-speed gear train, the super-low-speed gear train continues to be in a separated state.

Referring to FIG. 1, the arm 10 is urged towards a stopper member 21 by the resilient force of a torsion spring 20 but still with a clearance therebetween due to the counter-acting force of spring 22 in the illustrated position, thereby causing the gear shift shaft 7 to be pressed to a position in which the third and fourth speed gear train are established, i.e., a position in which the finger 13 engages with the connecting member 5 of the gear shift rod 3. In in this position, a cylindrical stopper member 23 urged by the spring 22 is engaged with the locking member 11 holding the arm 10 in the position shown. In order to establish a fifth speed gear train with the finger 13 engaged with the connecting member 5a, it is necessary to further move the gear shift shaft 7 in the upward direction in FIG. 1 against the resilient force of the spring 22 until the clearance between the arm 10 and the stopper 21 is eliminated.

Referring to FIG. 4 in addition to FIG. 1, a ball 25 or a ball-like member is provided on one side of the locking member 11 in such a manner that the ball is pressed resiliently against the member 11 by a spring 26. An inclined surface 24 is formed on the side portion of the locking member 11. The position of this inclined surface 24 is determined such that the ball 25 contacts the inclined surface 24 immediately before the fingers 12, 13 engage, during the movement of the gear shift shaft 7, with the connecting member 5c of the gear shift rod 2 for a super-low-speed gear train and the connecting member 5d of the gear shift rod 4 for the reverse gear train. Accordingly, as the ball 25 climbs the inclined surface 24, a large resistance force works against the downward movement in FIG. 4 of the gear shift shaft 7. Therefore, the driver on the vehicle can be prevented most effectively from shifting by mistake the gear shift shaft 7 to the reverse position or a super-low-speed position.

The operation of this embodiment will now be described. In order to shift the gear, the shaft 9 is turned to move the gear shift shaft 7 by the arm 10 in the axial direction to a desired position and engage one or both of the fingers 12, 13 with one or both of the connecting members 5, 5a. The gear shift shaft 7 is then turned around its axis by the crank arm 8. Consequently, one or two of the gear shift rods 1–4 are moved in the axial direction to establish or separate a desired gear train.

In this gear shift device, the four gear shift rods 1–4 are divided into two groups each of which consists of two gear shift rods disposed in the positions close to each other. These two groups are disposed so that they are spaced from each other in the axial direction of the gear shift shaft 7. Since a pair of fingers 12, 13 are disposed in opposition to these two groups of gear shift rods 1–4, the lateral distances between the gear shift shaft 7, gear shift rods 1-4 and clutch can be reduced, and the shafts in the gear transmission can be disposed in desired positions. This enables the construction of the gear shift device to be simplified, and the weight thereof to be minimized. The dimensions and weight of the connecting members 5, 5a 5b, 5c, 5d, and shift forks 6, 6', 6a can also be reduced.

A pair of shift forks 6, 6' are provided on the gear shift rod 3 for three-step high-speed gear train. One shift fork 6' is moved with the gear shift rod 3 to select the fifth speed. The other shift fork 6 is moved slidingly along the gear shift rod 3 with the rod not being moved, to select the third and fourth speeds. Therefore, the gear shift device can be simplified in spite of its six-step forward and one-step reverse speed changing functions.

Moreover, two fingers 12, 13 are adapted to engage with the connecting member 5 5c of the gear shift rod 2 for a super-low-speed gear train and connecting member 5 5d of the gear shift rod 4 for a reverse gear train in the same position with respect to the axis of the gear shift shaft 7. Thus, a super-slow-speed operation and a reverse operation can be selected depending upon the amount and direction of the pivotal movement of the gear shift shaft 7. This also contributes to the simplification of the construction and operation of the gear shift device.

The gear shift shaft 7 is urged by the resilient force of the torsion spring 20, and adapted to be returned to a neutral position (a position between the third and fourth speed gear trains, which is generally known) every time the gear train is separated. In order to establish a fifth speed gear train, it is necessary to move the gear shift shaft 7 against the resilient force of the spring 23. When the gear shift shaft 7 is thus moved, the resilient force of the torsion spring 20 is rendered ineffective. Before the gear shift shaft 7 has moved to a position in which a super-low-speed gear train or a reverse gear train can be established, a large resistance force works thereon owing to the inclined surface 24 and the ball 25 urged resiliently thereagainst by the spring 26. Accordingly, this gear shift device has a high gear shifting sensitivity, and enables the driver to prevent shift position-selecting errors most effectively.

According to the present invention described above, a plurality of gear shift rods consisting of a plurality of groups of rods are disposed in a plurality of positions which are spaced from each other along the axis of the gear shift shaft, and the fingers are fixed to a plurality of spaced portions of the gear shift shaft so as to be opposed to the groups of the gear shift rods. Therefore, the gear shift rods can be disposed near the gear shift shaft, and the distances between the gear shift rods and clutch can be reduced. Accordingly, the dimensions and weights of the fingers, connecting members and shift forks can be minimized. Moreover, the construction of the gear shift device as a whole becomes comparatively simple, so that the device can be suitably used for a multi-step speed changing operation.

It is readily apparent that the above-described gear shift device meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A gear shift device for transmissions, comprising a plurality of gear shift rods provided with connecting members and clutch-actuating shift forks, said rods being arranged in parallel with one another and mounted to be movable in the lengthwise direction thereof, and a gear shift shaft provided with fingers engageable with said connecting members, said gear shift shaft being disposed at right angles to said gear shift rods and rotationally and axially movable around and along an axis thereof, said gear shift rods consisting of a plurality of groups of rods disposed in a plurality of positions which are spaced from each other along the axis of said gear shift shaft, said fingers being fixed to a plurality of spaced portions of said gear shift shaft so as to be opposed to said groups of gear shift rods.

2. A gear shift device for transmissions according to claim 1, wherein a gear shift rod for a reverse gear train and a gear shift rod for a three-step high-speed gear train, and a gear shift rod for a super-low-speed gear train and a gear shift rod for a two-step low-speed gear train are formed into groups and arranged in that manner, said gear shift rod for a three-step high-speed gear train being provided with a pair of shift forks, one of which is fixed to said rod, and the other of which is provided with an independent connecting member and slideably mounted to said rod in such a manner that the second-mentioned shift fork can be moved in the lengthwise direction of said rod.

3. A gear shift device for transmissions according to claim 2, wherein the distance between the connecting member provided on said gear shift rod for a reverse gear train and that provided on said gear shift rod for a super-low-speed gear train is set equal to the distance, which is measured along the axis of said gear shift shaft, between the two fingers on the gear shift shaft, said gear shift rod for a reverse gear train and a shift fork for establishing a reverse gear train being connected together with a structure, which consists of a pin provided on one of said gear shift rod and said shift fork, and a groove provided in the other thereof so as to lock said pin therein and having a portion extending in parallel with said gear shift rod, for the purpose of enabling an idle movement, which corresponds to a super-low-speed gear train-establishing operation, of said gear shift rod.

4. A gear shift device for transmissions according to claim 2, wherein said gear shift shaft is urged against a stopper member by a spring so as to hold said shaft in a position in which a certain finger engages with a connecting member provided on a gear shift rod for a non-maximum-speed forward step gear train, said stopper member being urged resiliently against said gear shift shaft so as to enable a connecting member for a maximum-speed gear train and said finger to engage with each other, said gear shift shaft being provided with an inclined surface and a ball or ball-like member engageable with said inclined surface and urged resiliently against said gear shift shaft, so as to make resistance to the movement of said gear shift shaft to a position in which said two connecting members for a super-low-speed gear train and a reverse gear train and said two fingers engage with each other, immediately before said gear shift shaft has started being moved to said position.

5. A gear shift device for transmissions according to claim 3, wherein said gear shift shaft is urged against a stopper member by a spring so as to hold said shaft in a position in which a certain finger engages with a connecting member provided on a gear shift rod for a non-maximum-speed forward step gear train, said stopper member being urged resiliently against said gear shift shaft so as to enable a connecting member for a maximum-speed gear train and said finger to engage with each other, said gear shift shaft being provided with an inclined surface and a ball or ball-like member engageable with said inclined surface and urged resiliently against said gear shift shaft, so as to make resistance to the movement of said gear shift shaft to a position in which said two connecting members for a super-low-speed gear train and a reverse gear train and said two fingers engage with each other, immediately before said gear shift shaft has started being moved to said position.

6. A gear shift device for transmission according to claim 1, wherein said gear shift rods consist of four shift rods comprising a gear shift rod for first and second speed gear trains, a gear shift rod for super-low-speed gear train, a gear shift rod for third, fourth and fifth speed gear trains, and a gear shift rod for reverse gear train, these four shift rods being arranged into two groups of which one group includes the shift rod for first and second speed gear trains and the shift rod for super-low-speed gear train and the other group includes the shift rod for third, fourth, and fifth speed gear trains and the shift rod for reverse gear train, wherein said gear shift shaft has two fingers fixed thereto at positions corresponding to said two groups of the gear shift rods, respectively, said gear shift rod for third, fourth and fifth speed gear trains being provided with a shift fork for establishing the fifth speed gear train which is fixed to the gear shift rod and another shift fork for establishing the third and fourth speed gear trains which is axially slidable on said gear shift rod, these shift forks being associated with respective connecting members, and wherein the connecting members provided on the gear shift rod for reverse gear train and the gear shift rod for super-low-speed gear train come into engagement with said fingers at the same axial position of said gear shift shaft but are adapted to cause their corresponding clutches to be connected through rotative operations of the gear shift shaft in opposite directions to each other.

* * * * *